United States Patent
Ben-Shalom et al.

(10) Patent No.: US 10,027,717 B2
(45) Date of Patent: Jul. 17, 2018

(54) PEER-TO-PEER GROUP VIGILANCE

(71) Applicant: McAfee, Inc., Santa Clara, CA (US)

(72) Inventors: Omer Ben-Shalom, Rishon le-Tzion (IL); Alex Nayshtut, Gan Yavne (IL); Oleg Pogorelik, Lapid (IL); Igor Muttik, Aylesbury (GB)

(73) Assignee: McAfee, LLC, Santa Clara, CA (US)

( * ) Notice: Subject to any disclaimer, the term of this patent is extended or adjusted under 35 U.S.C. 154(b) by 190 days.

(21) Appl. No.: 14/752,299

(22) Filed: Jun. 26, 2015

(65) Prior Publication Data

US 2016/0381079 A1 Dec. 29, 2016

(51) Int. Cl.
*H04L 29/06* (2006.01)

(52) U.S. Cl.
CPC ............ *H04L 63/205* (2013.01); *H04L 63/20* (2013.01); *H04L 63/105* (2013.01)

(58) Field of Classification Search
None
See application file for complete search history.

(56) References Cited

U.S. PATENT DOCUMENTS

| | | | | |
|---|---|---|---|---|
| 5,436,972 | A * | 7/1995 | Fischer | G06F 12/1408 380/286 |
| 8,671,449 | B1 * | 3/2014 | Nachenberg | G06F 21/56 713/187 |
| 9,065,849 | B1 | 6/2015 | Rivera et al. | |
| 2004/0128426 | A1 * | 7/2004 | Wilcox | G06F 1/28 711/1 |
| 2006/0253458 | A1 * | 11/2006 | Dixon | G06Q 30/02 |
| 2008/0133540 | A1 * | 6/2008 | Hubbard | H04L 63/101 |
| 2009/0328209 | A1 * | 12/2009 | Nachenberg | G06Q 10/10 726/22 |
| 2012/0291087 | A1 * | 11/2012 | Agrawal | G06F 21/55 726/1 |
| 2016/0359872 | A1 * | 12/2016 | Yadav | H04L 43/04 |
| 2016/0359888 | A1 * | 12/2016 | Gupta | H04L 63/1425 |
| 2016/0359917 | A1 * | 12/2016 | Rao | H04L 63/1425 |

FOREIGN PATENT DOCUMENTS

| | | |
|---|---|---|
| JP | 2010266966 A | 11/2010 |
| KR | 1020030027646 A | 4/2003 |
| KR | 1020140127178 A | 11/2014 |

OTHER PUBLICATIONS

International Search Report received in corresponding PCT application No. PCT/US2016-034415, dated Aug. 24, 2016.

* cited by examiner

*Primary Examiner* — William J. Goodchild
(74) *Attorney, Agent, or Firm* — Hanley, Flight & Zimmerman, LLC

(57) ABSTRACT

Providing peer-to-peer network security includes collecting, by a local trusted network device, local trust data related to behavior of the local trusted network device, receiving, by one or more remote trusted network devices, additional trust data for the local trusted network device, calculating a combined trust score for the local trusted network device based on the local trust data and additional trust data, and modifying activity of the local trusted network device based on the combined trust score.

21 Claims, 7 Drawing Sheets

PEER-TO-PEER GROUP VIGILANCE

TECHNICAL FIELD

Embodiments described herein generally relate to network security, and more particularly to providing peer-to-peer group vigilance to provide network security among trusted network devices.

BACKGROUND ART

Today's computer networks consist of many computing devices exchanging data and interacting with each other. One issue that arises with the rise in computer networks is the ability to detect a misbehaving device or host within the network, and blocking the misbehaving device from continuing is activities without the need for an additional network device capable of handling the detection of the misbehaving device, the decision making, and the security response.

Current solutions to provide network security are based on infrastructure elements, such as servers, appliances, and firewalls, collecting and processing data in order to detect problematic activities and their ability to trigger the necessary containment actions. For example, an intrusion detection system (IDS) may detect a problematic device, a security information and event management (SIEM) component determines whether to block the device, and a closest network device enforces the decision. However, this approach results in several issues. For example, due to the latency between a problematic device and the infrastructure, the analysis cannot be completed in real time. Additionally, the solution is not scalable onto large hierarchical networks, such as the Internet of Things. Further, the infrastructure required to provide such security results in a single point of failure. Thus, a solution is needed to provide network security.

DESCRIPTION OF EMBODIMENTS

In the following description, for purposes of explanation, numerous specific details are set forth in order to provide a thorough understanding of the invention. It will be apparent, however, to one skilled in the art that the invention may be practiced without these specific details. In other instances, structure and devices are shown in block diagram form in order to avoid obscuring the invention. References to numbers without subscripts or suffixes are understood to reference all instance of subscripts and suffixes corresponding to the referenced number. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one embodiment of the invention, and multiple references to "one embodiment" or "an embodiment" should not be understood as necessarily all referring to the same embodiment.

As used herein, the term "computer system" can refer to a single computer or a plurality of computers working together to perform the function described as being performed on or by a computer system.

As used herein, the term "network device" can refer to any computer system that is capable of communicating with another computer system across any type of network.

As used herein, the term "trusted device" or "trusted network device" may refer to a network device that is capable of trusted operations. A trusted device may view certain available services hosted by other trusted devices in a trusted network, whereas devices in a network that are not trusted network devices are prevented from accessing the services.

As used herein, the term "trusted execution environment" may refer to an isolated execution environment that provides a secured execution space and can communicate with other trusted execution environments in remote devices.

In one or more embodiments, a technique is provided for providing peer-to-peer group vigilance. In one or more embodiments, providing peer-to-peer group vigilance includes providing network security using group-based trust. A trusted network device may determine a trust score for a network device, either the local device, or a remote device, based on locally collected data as well as trust data received from other devices in the network. The trusted network may identify problematic devices based on the collected trust data, and cause the problematic device to restrict its activities.

Figure 1:
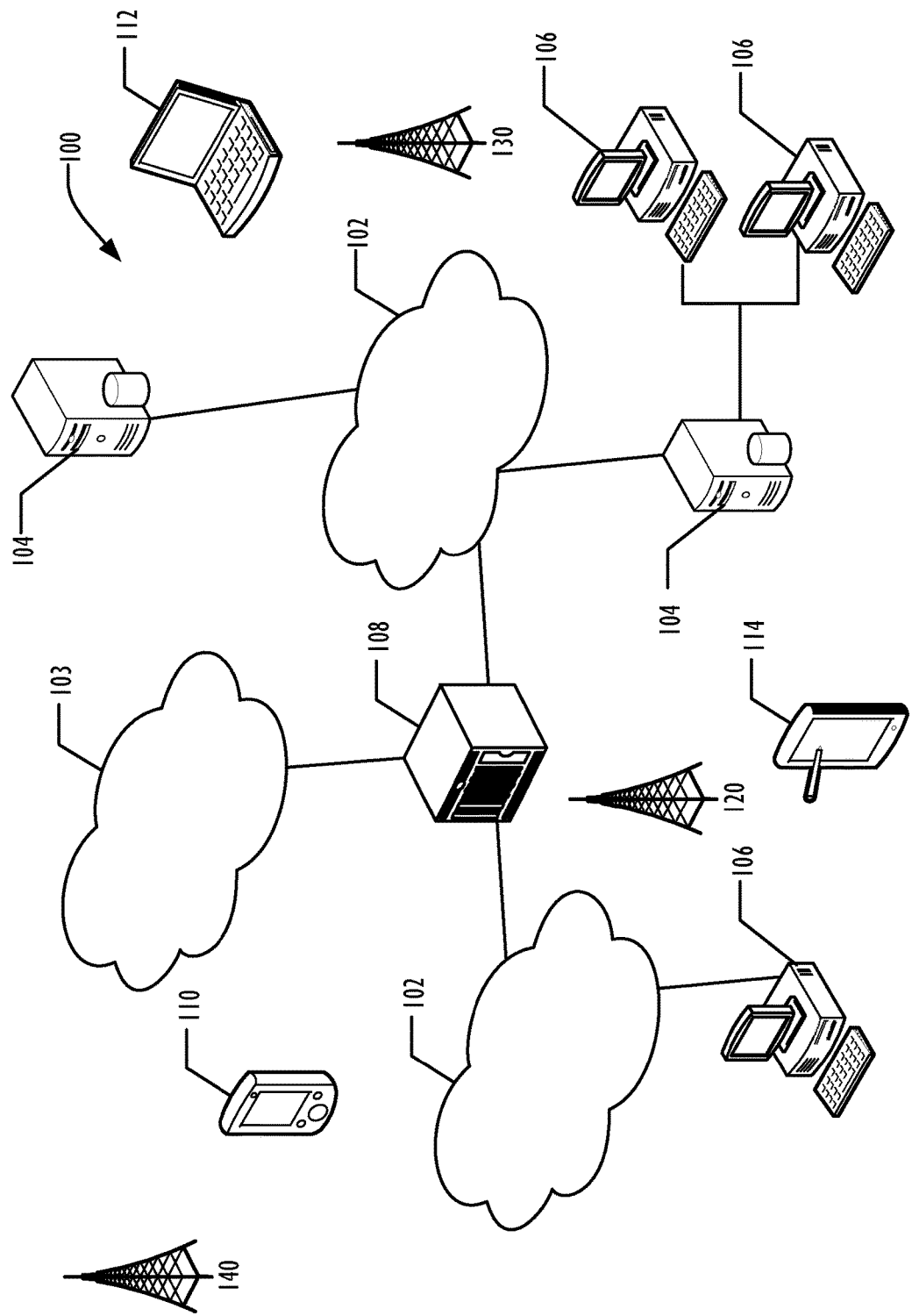
FIG. 1 is a diagram illustrating a network of programmable devices according to one or more embodiments.

Referring to the figures, FIG. 1 an example infrastructure 100 in which embodiments may be implemented is illustrated schematically. Infrastructure 100 contains computer networks 102. Computer networks 102 may include many different types of computer networks available today, such as the Internet, a corporate network, or a Local Area Network (LAN). Each of these networks can contain wired or wireless programmable devices and operate using any number of network protocols (e.g., TCP/IP). Networks 102 may be connected to gateways and routers (represented by 108), end user computers 106, and computer servers 104. Infrastructure 100 also includes cellular network 103 for use with mobile communication devices. Mobile cellular networks support mobile phones and many other types of mobile devices. Mobile devices in the infrastructure 100 are illustrated as mobile phones 110, laptops 112, and tablets 114. A mobile device such as mobile phone 110 may interact with one or more mobile provider networks as the mobile device moves, typically interacting with a plurality of mobile network towers 120, 130, and 140 for connecting to the cellular network 103. Each of the networks 102 may contain a number of other devices typically referred to as Internet of Things (microcontrollers, embedded systems, industrial control computing modules, etc.). Although referred to as a cellular network in FIG. 1, a mobile device may interact with towers of more than one provider network, as well as with multiple non-cellular devices such as wireless access points and routers 108. In addition, the mobile devices 110, 112, and 114 may interact with non-mobile devices such as computers 104 and 106 for desired services. The functionality of the gateway device 108 may be implemented in any device or combination of devices illustrated in FIG. 1; however, most commonly is implemented in a firewall or intrusion protection system in a gateway or router.

In one or more embodiments, one or more of the devices connected across network 102 may support trusted operations through the employment of a trusted execution environment (TEE). Devices in the network that support trusted operations may be referred to as trusted network devices. Trusted networks may be formed dynamically using trusted discovery which allows trusted network devices to discover other trusted network devices, or trusted network nodes, that include a trusted entity. One example is the inclusion of Intel® Manageability Engine which is available from the Intel Corporation. (INTEL is a registered trademark of Intel Corporation.) For purposes of the current disclosure, trusted networks may be formed by any means that allow services on trusted devices to remain opaque to network devices that are not part of the trusted network. Whereas untrusted discovery may reveal whether a particular node or network device may support trusted discovery, trusted discovery may be necessary to reveal additional trusted capabilities and services among trusted devices. Some examples of protocols that may be revealed only by trusted discovery include attestation, key agreement, group formation, trusted proxy, and provisioning.

Peer-to-peer vigilance in a trusted network may be performed by a peer behavior analysis engine, self-assessment logic engine, and enforcement engine in trusted network devices. In one or more embodiments, the peer behavior analysis engine, self-assessment logic engine, and enforcement engine are hardened using Trusted Execution Environment (TEE) technology, such as Intel® SGX, to protect functionality governing the expansion and contraction of the trusted network. The various engines will be explained in further detail below.

Figure 2:
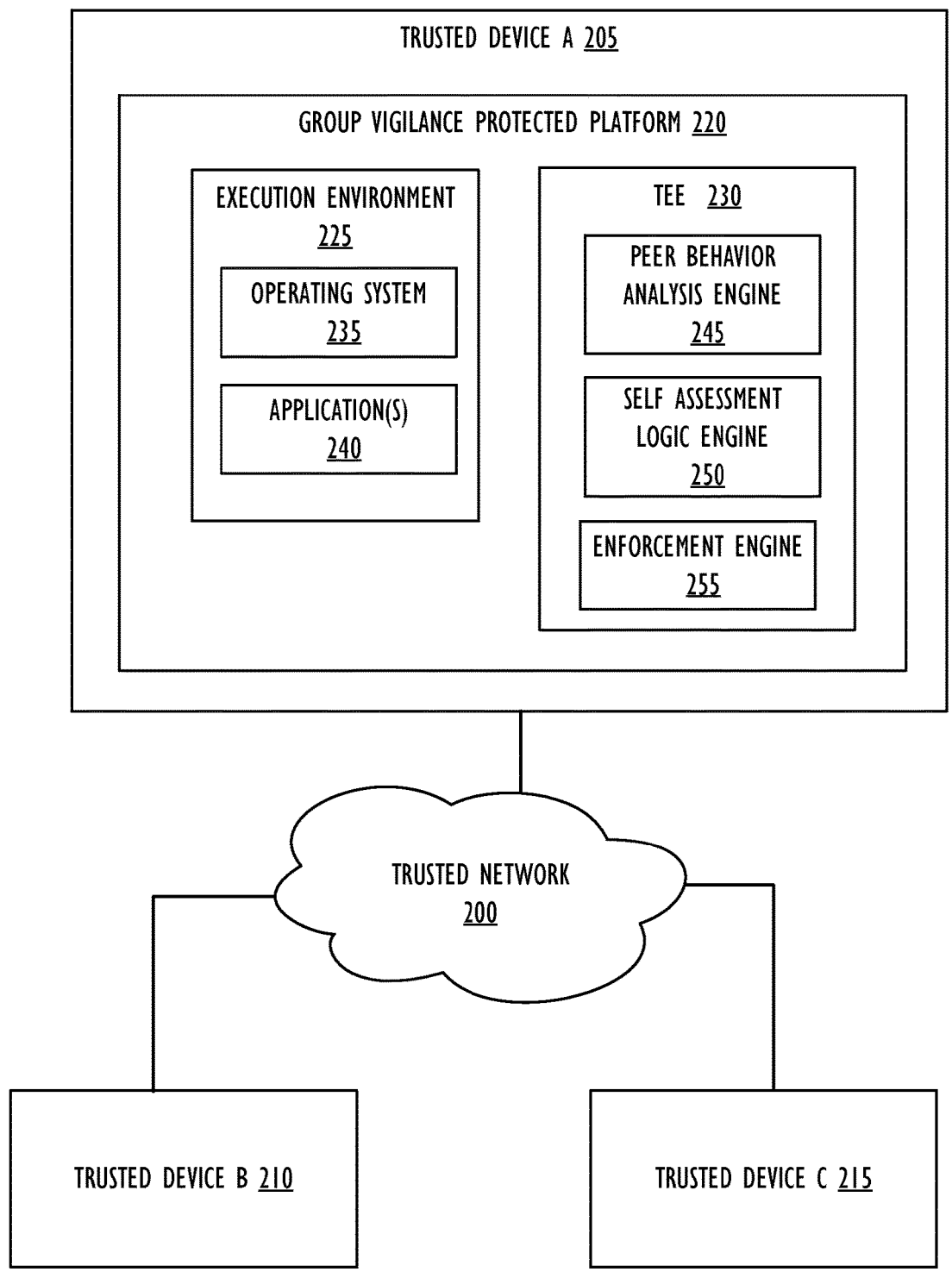
FIG. 2 is a diagram illustrating a system for peer-to-peer group vigilance in a network according to one or more embodiments.

FIG. 2 is a diagram illustrating a system for peer-to-peer group vigilance in a network according to one or more embodiments. FIG. 2 includes three devices, including trusted device A 205, trusted device B 210, and trusted device C 215, connected across trusted network 200. Network 200 may be any type of computer network, such as a LAN or a corporate network. For example, Network 200 may include a subset of the devices included in larger network 102 or 103.

Each of trusted device 205, 210, and 215 includes a group vigilance protected platform (GVPP), such as GVPP 220. In one or more embodiments, the presence of a GVPP identifies a network device as a trusted network device. For purposes of explanation, FIG. 2 only depicts trusted device A 205 as including GVPP 220, although in one or more embodiments, trusted device B 210 and trusted device C 215 also include a GVPP.

GVPP 220 includes a main execution environment 225, along with a trusted execution environment (TEE) 230. Execution environment 225 supports the execution of operating system 235 and other applications 240. For example, applications 240 may require operating system 235 in order to utilize various resources provided by trusted device A 205.

Running alongside execution environment 225 is trusted execution environment (TEE) 230. TEE 230 is a secure execution environment that provides secure services to operating system 235. TEE 230 may securely communicate with a TEE in another device, such as trusted device B 210 or trusted device C 215. In one or more embodiments, TEE 230 provides a number of functions depicted as various modules. For example, TEE 230 may include a peer behavior analysis engine 245, a self-assessment logic engine 250, and an enforcement engine 255.

In one or more embodiments, the peer behavior analysis engine 245 receives events and indicators from one or more remote device, such as from hardware, the operating system, or the software stack, including attestation measurements, network transmissions, operating system messages, APIs, heartbeat/health status data, etc. The peer behavior analysis engine may analyze behavior such as network traffic to and from the device, physical characteristics such as temperature change of the device, or a workload of the device. As another example, the peer behavior analysis engine may receive data from a sensor on the device that detects physical tampering of the device. The peer behavior analysis engine 245 may utilize rules or heuristics, stored either locally or distributed across the network, to determine the trustworthiness of other network devices in the trusted network. For example, the rules or heuristics may be stored as a data structure. The peer behavior analysis engine 245 may then deploy the collected data to the remote device for which the data is collected. In one or more embodiments, the peer behavior analysis engine may calculate a trust score for the remote device and transmit the trust score as part or all of the trust data to the remote device. Thus, the peer behavior analysis engine may provide a remote device with a perceived trust level from the perspective of the local device. In one or more embodiments, the peer-to-peer communication between the TEEs may be encrypted and protocols that prevent spoofing or replay attacks can be employed. The security of the TEE itself may assist in establishing authenticity of transmissions between the TEEs.

In one or more embodiments, the self-assessment logic engine 250 may receive trust scores from other devices and assess if the execution environment 225 may be permitted to operate normally, or if operation should be restricted. In one or more embodiments, the self-assessment logic engine may also collect local trust data. Because the TEE 230 is separate from the main execution environment 225, TEE 230 can be trusted to collect local trust data, such as events and indicators from one or more remote device, such as from hardware, the operating system, or the software stack, including attestation measurements, network transmissions, operating system messages, APIs, heartbeat/health status data, etc. The peer behavior analysis engine may analyze behavior such as network traffic to and from the device, physical characteristics such as temperature change of the device, or a workload of the device.

The self-assessment logic engine 250 may calculate a combined trust score taking into consideration the trust data received from TEEs of other devices, as well as the trust data collected locally. In one or more embodiments, the self-assessment logic engine 250 may wait until trust data is received by a quorum of devices in the secure network prior to calculating a combined trust score. A quorum may be determined, for example, when the number of remote devices from which trust data is receives satisfies a threshold number of trusted devices, or a threshold percentage of all trusted devices in the trusted network 200. In addition, other information may be utilized to determine whether a quorum is satisfied. For example, the self-assessment logic engine 250 may only consider trust data if it is recent data, such as trust data received within a particular time period. If, based on the collective trust score, the device deems itself sufficiently untrustworthy, the self-assessment logic engine 250 transmits instructions to restrict activity to the enforcement engine 255.

In one or more embodiments, the enforcement engine 255 receives instructions from the self-assessment logic engine 250 and implements the required enforcement. For example, enforcement engine 255 may limit network access of trusted device A 205. Enforcement engine 255 may additionally, or alternatively, cause a hardware restart, firmware re-flash, or take any other action to restrict and/or correct trusted device A 205.

In an alternate embodiment of the invention, self-assessment of a particular TEE in the system may be offloaded to anther TEE in the system. For example, if trusted device A 205 has limited resources for handling behavior analysis, the functionality of self-assessment logic engine 250 may be offloaded to trusted device B 210 or trusted device C 215. For example, self-assessment logic engine 250 may optionally continue to collect local trust data, and potentially calculate a local trust score. TEE 230 may transmit the local data regarding trusted device A 205. Trust data from remote devices may be received at trusted device A 205 and sent to trusted device B 210 for processing, or trusted device B 210 may be considered to include a proxy self-assessment logic engine for trusted device A 205. Trusted device B 210 may determine a combined trust score for trusted device A 205, and transmit instructions back to TEE 230 to be performed by enforcement engine 255. It should be understood that because the TEEs in each trusted device may securely communicate with each other, the various functionality of each of peer behavior analysis engine 245, self-assessment logic engine 250, and enforcement engine 255 may be distributed among the various TEEs in trusted network 200.

Figure 3:
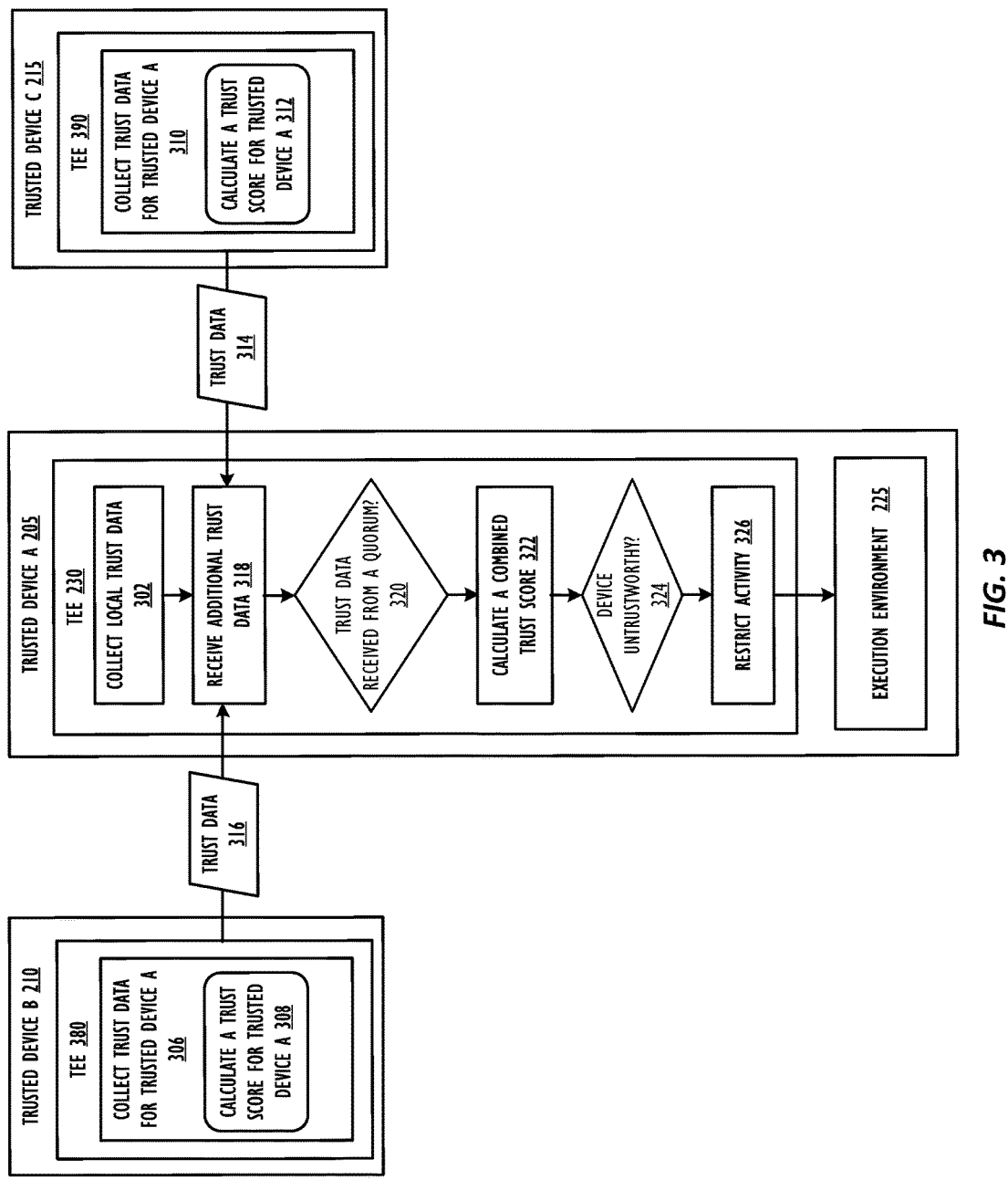
FIG. 3 is a flow diagram illustrating a technique for restricting activity in a local trusted network device, according to one or more embodiments.

FIG. 3 is a flow diagram illustrating a technique for restricting activity in a local trusted network device, according to one or more embodiments. FIG. 3 illustrates a method occurring primarily at trusted device A 205 to restrict the activity of trusted device A 205. The method begins at 302, where trusted device A 205 collects local trust data. In one or more embodiments, the local trust data is collected by self-assessment logic engine 250. The local trust data may include events and indicators in the device, such as from hardware, the operating system, or the software stack, including attestation measurements, network transmissions, operating system messages, APIs, heartbeat/health status data, etc. The peer behavior analysis engine may analyze behavior such as network traffic to and from the device, physical characteristics such as temperature change of the device, or a workload of the device.

At 306 and 310, trust device B 210 and trusted device C 215, respectively, collect trust device for trusted device A 205. Trust data may be collected by TEE 380 in trusted device B 210 and TEE 390 in trusted device C 215. For example, TEE 380 and TEE 390 may each include a peer behavior analysis engine. In one or more embodiments, at 308 and 310, trusted device B 210 and trusted device C 215, respectively, could each calculate a trust score for trusted device A 308.

At 318, trusted device A 205 receives additional trusted data 316 and 318 from trusted device B 210 and trusted device C 25, respectively. In one or more embodiments the trusted data 316 and 318 may be received in the form of raw data, or may be analyzed by trusted device B 210 and trusted device C 215 to include a trust score for trust device A 205.

At 320 a determination is made regarding whether trust data is received from a quorum of remote trusted devices, such as trusted device B 210 and trusted device C 215, according to one or more embodiments. The method may wait at 320 for the trust data to be received. The collected trust data may be more reliable when it considers trust data from various trusted devices in the trusted network. Determining whether trust data receives from a quorum may include determining, for example, when the number of remote devices from which trust data satisfies a threshold number of devices, or a threshold percentage of all devices in the trusted network. In addition, a quorum may be determined based on the number of remote devices from which recent trust data has been received, such as within a particular time period. In one or more embodiments, the determination at 320 is optional, and the method may proceed without regard to determining that trust data is received from a quorum of network devices.

In one or more embodiments, the method continues to 322, and trusted device A 205 calculates a combined trust score. The combined trust score may be calculated, for example, by averaging trust scores received by trusted devices in the trusted network, or by calculating the combined trust score from raw trust data received from various trusted network devices. In addition, calculating a combined trust score may include weighting trust data based on the source of the trust data. For example, in one or more embodiments, local trust data may be weighed more or less than trust data collected from remote trusted devices. Further, calculating a combined trust score may include weighting trust data based on how old or recent the trust data is. For example, more recent trust data may be weighted more heavily than older trust data when calculating a combined trust score. In one or more embodiments, calculating a combined trust score when using raw trust data may include weighting certain trust data more than other trust data. For example, trust data that relates to data flow may be weighted more or less than trust data that relates to processing workload of the device. It should be understood that calculating the trust score may also include any combination of the described embodiments.

The method continues at 324 and a determination is made regarding whether trusted device A 205 is untrustworthy. In one or more embodiments, the device may be determined to be untrustworthy when the combined trust score satisfies, or does not satisfy, a predefined trust threshold. If it is determined that the device is untrustworthy, then the method continues at 326 and trusted device A 205 restricts activities of trusted device A 205. In one or more embodiments, the enforcement engine 255 transmits instructions to the execution environment 225 to restrict the activity in some way or perform a corrective action. For example, enforcement engine 255 may transmit instructions to cause trusted device A 205 to be quarantined, or otherwise limit the behavior of trusted device A 205.

Figure 4:
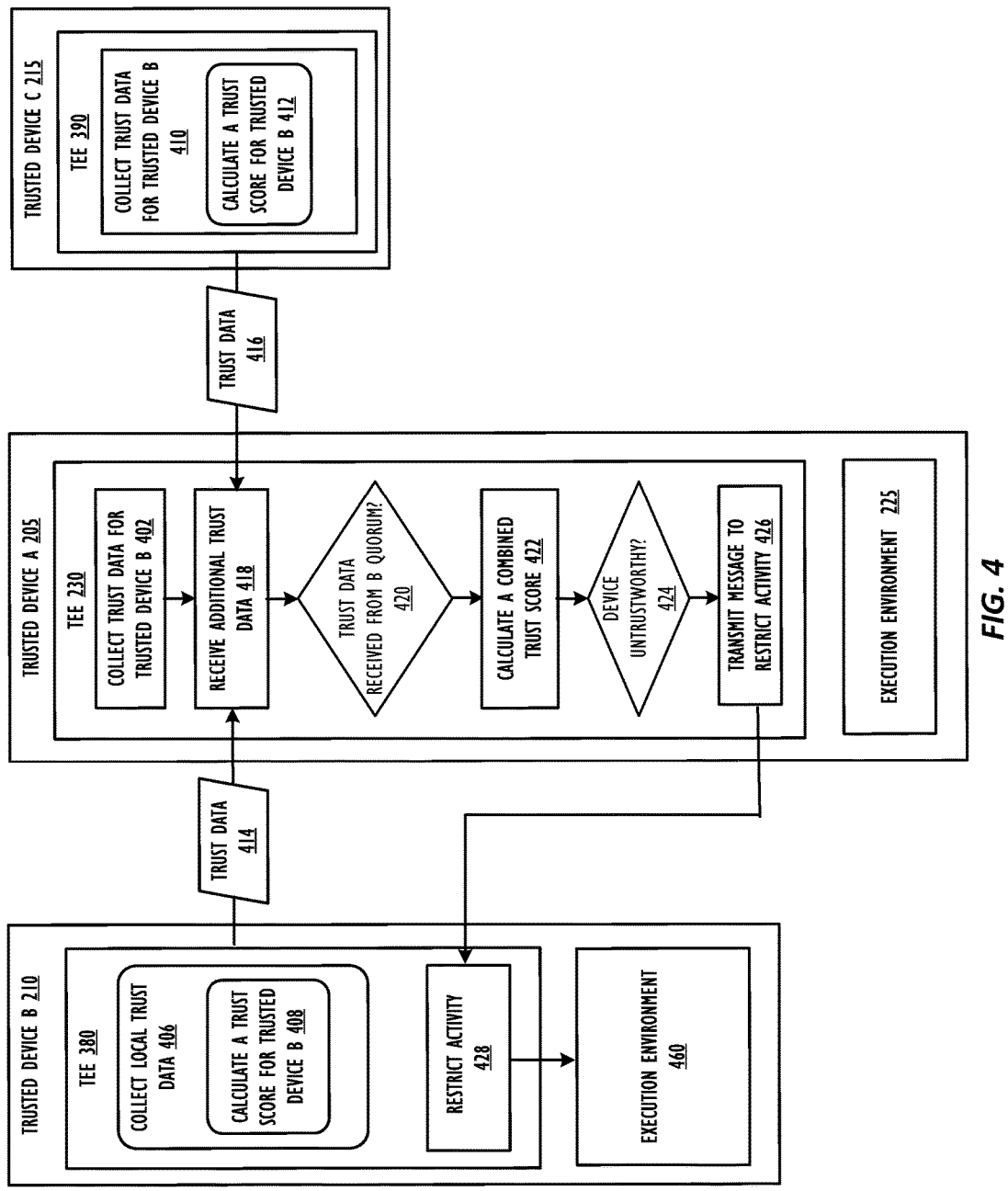
FIG. 4 is a flow diagram illustrating a technique for restricting activity in a remote trusted network device according to one or more embodiments.

FIG. 4 is a flow diagram illustrating a technique for restricting activity in a remote trusted network device according to one or more embodiments. FIG. 4 also includes trusted device A 205, trusted device B 210, and trusted device C 215. For purposes of the example depicted in FIG. 4, trusted device A 205 has been designated to assess the trustworthiness of device B 210. Thus, whereas in the example method depicted in FIG. 3 a trusted device manages trustworthiness of itself, in the example method depicted in FIG. 4, trusted device A 205, and more particularly the functionality of TEE 230 is configured to determine the trustworthiness of remote trusted device B 210. In some embodiments the devices in the trusted network may algorithmically and dynamically configure which sets of devices are the assessors and which are under assessment.

The method begins at 402, where trusted device A 205 collects trust data for trusted device B 402. That is, trusted device A 205 collects trust data regarding the trustworthiness as it appears from trusted device A 205. The trust data may include events and indicators in trusted device B 210, such as from hardware, network transmissions, heartbeat/health status data, attestation measurements of the TEEs, and the like.

At 406 and 410, trust device B 210 and trusted device C 215, respectively, collect trust device for trusted device B 210. For example, a self-assessment logic engine in trusted device B 210 may gather local trust data and transmit it to trusted device A 205 as trust data 414. In addition, trusted device C 215 may gather trust data about trusted device B 210, for example, using a peer behavior analysis engine, and transmit the trust data as 416. In one or more embodiments, at 408 and 410, trusted device B 210 and trusted device C 215, respectively, could each calculate a trust score for trusted device B 210.

At 418, trusted device A 205 receives the additional trusted data 416 and 418 from trusted device B 210 and trusted device C 215, respectively. In one or more embodiments the trusted data 416 and 418 may be received in the form of raw data, or may be analyzed by trusted device B 210 and trusted device C 215 to include a trust score for trust device B 210.

At 420 a determination is made regarding whether trust data is received from a quorum of remote trusted devices, such as trusted device B 210 and trusted device C 215, according to one or more embodiments. The method may wait at 420 for the trust data to be received. The collected trust data may be more reliable when it considers trust data from various trusted devices in the trusted network. Determining whether trust data receives from a quorum may include determining, for example, when the number of remote devices from which trust data satisfies a threshold number of devices, or a threshold percentage of all devices in the trusted network. In addition, a quorum may be determined based on the number of remote devices from which recent trust data has been received, such as within a particular time period. In one or more embodiments, the determination at 320 is optional, and the method may proceed without regard to determining that trust data is received from a quorum of network devices.

In one or more embodiments, the method continues a 422, and trusted device A 205 calculates a combined trust score. The combined trust score may be calculated, for example, by averaging trust scores received by trusted devices in the trusted network, or by calculating the combined trust score from raw trust data received from various trusted network devices. In addition, calculating a combined trust score may include weighting trust data based on the source of the trust data. For example, in one or more embodiments, local trust data may be weighed more or less than trust data collected from remote trusted devices. Further, calculating a combined trust score may include weighting trust data based on how old or recent the trust data is. For example, more recent trust data may be weighted more heavily than older trust data when calculating a combined trust score. In one or more embodiments, calculating a combined trust score when using raw trust data may include weighting certain trust data more than other trust data. For example, trust data that relates to data flow may be weighted more or less than trust data that relates to processing workload of the device. It should be understood that calculating the trust score may also include any combination of the described embodiments.

The method continues at 424 and a determination is made regarding whether trusted device B 210 is untrustworthy. In one or more embodiments, the device may be determined to be untrustworthy when the combined trust score satisfies, or does not satisfy, a predefined trust threshold. If it is determined that the device is untrustworthy, then the method continues at 426 and trusted device A 205 restricts activities of trusted device B 210. In one or more embodiments, the enforcement engine 255 transmits instructions to a TEE 380 in trusted device B 210 to restrict the activity in some way. For example, at 428 an enforcement engine in TEE 380 may transmit instructions to an execution environment 460 in trusted device B 210 to be quarantined, or otherwise limit the behavior of trusted device B 210.

Figure 5:
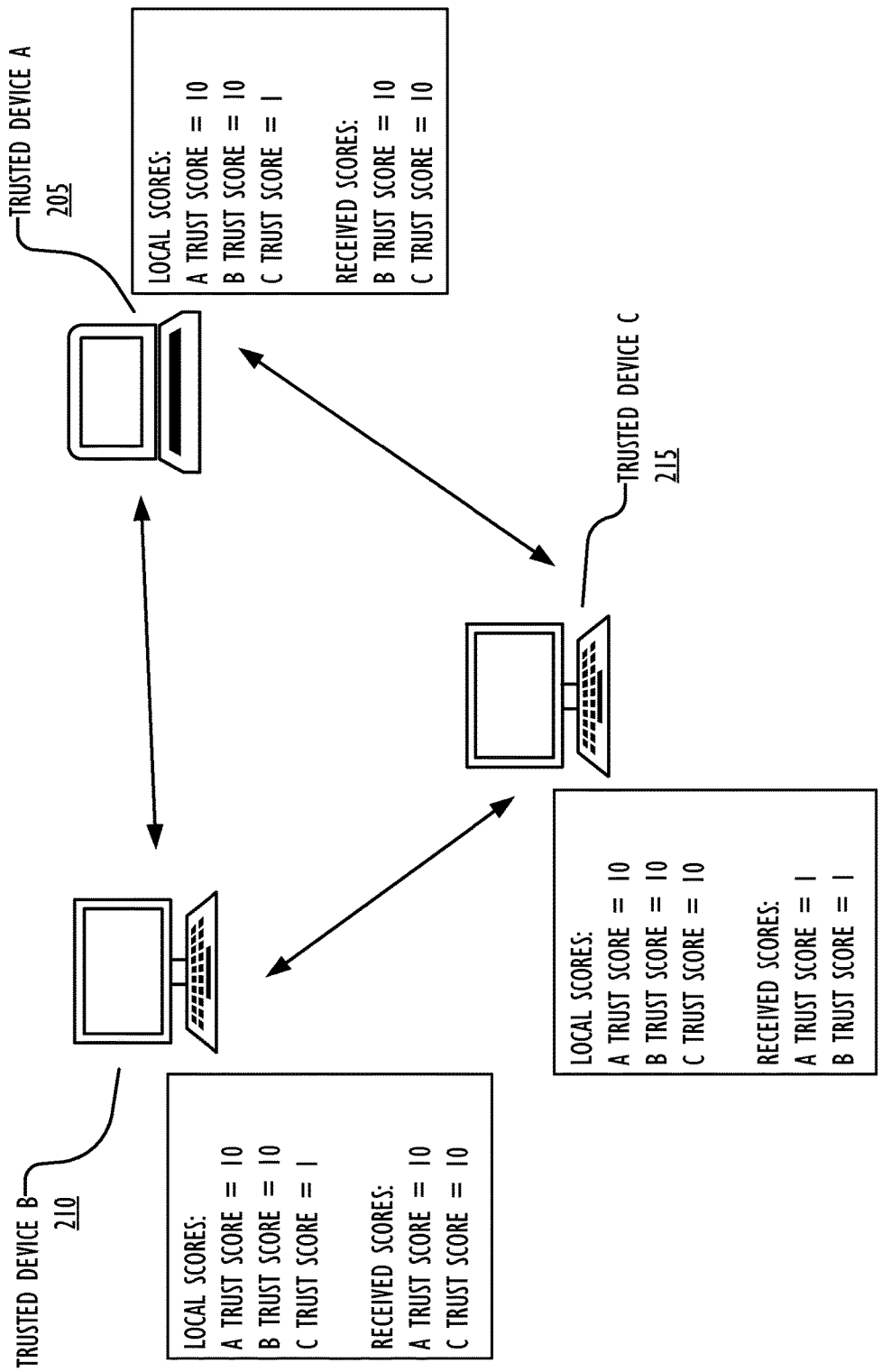
FIG. 5 is a flow diagram illustrating sharing of trust data across a network.

FIG. 5 depicts an example of the view of trust scores as they may be determined by peer behavior analysis engines and self-assessment logic engines in trusted device A 205, trusted device B 210, and trusted device C 215. Specifically, FIG. 5 depicts how trust scores can be calculated differently at each trusted device. It should be understood that the specific values and scores depicted in FIG. 5 are shown for example purposes only and are not intended to limit the scope of the description.

Each of trusted device A 205, trusted device B 210, and trusted device C 215 is depicted with various scores that may be determined locally (identified as "Local Scores"), and trust scores that may be received from remote devices (identified as "Received Scores"). In one or more embodiments, the various local scores and received scores may be stored as a data structure in the respective trusted device. In addition, the data structure may hold additional information about the trust data, such as data regarding when the data was received, or expiration information for the trust data. It should be understood that each trusted device may contain a subset of the depicted data.

In the example, trusted device A 205 calculates a local trust score as 10. Trusted device A 205 also locally calculates a perceived trust score for trusted device B 210 as 10, and a trust score for trusted device C 215 as 1. In one or more embodiments, the trust score for trusted device B 210 will be transmitted to trusted device B 210, and the trust score for trusted device C 215 will be transmitted to trusted device C 215. In addition, trusted device A 205 receives, from remote devices, perceived trust scores for itself. As depicted, trusted device A 205 receives a trust score of 10 from each of trusted device B 210 and trusted device C 215.

In the example, trusted device B 210 calculates a local trust score as 10. Trusted device B 210 also locally calculates a perceived trust score for trusted device A 205 as 10, and a trust score for trusted device C 215 as 1. In one or more embodiments, the trust score for trusted device A 205 will be transmitted to trusted device A 205, and the trust score for trusted device C 215 will be transmitted to trusted device C 215. In addition, trusted device B 210 receives, from remote devices, perceived trust scores for itself. As depicted, trusted device B 210 receives a trust score of 10 from each of trusted device A 205 and trusted device C 215.

In the example, trusted device C 215 calculates a local trust score as 10. Trusted device C 215 also locally calculates a perceived trust score for trusted device A 205 as 10, and a trust score for trusted device B 210 as 10. In one or more embodiments, the trust score for trusted device A 205 will be transmitted to trusted device A 205, and the trust score for trusted device B 210 will be transmitted to trusted device B 210. In addition, trusted device C 215 receives, from remote devices, perceived trust scores for itself. As depicted, trusted device C 215 receives a trust score of 1 from each of trusted device A 205 and trusted device B 210.

Each trusted device may determine, for example using a self-assessment logic engine, a combined trust score. In one or more embodiments, each trusted device may take a simple average of trust scores to determine a combined trust score, although any method could be used as described above. Further, each trusted device may compare the combined trust score to a trust threshold to determine whether the trusted device is trustworthy.

Consider example where each trusted device takes a simple average of trust scores and the trust threshold is 5. Trusted device A 205 would take the average of the local trust score (10), and the received trust scores from trusted device B 210 (10), and trusted device C 215 (10), and determine that the combined trust score is 10. Because 10 is above the trust threshold, trusted device A 205 determines that it is trustworthy. Trusted device B 210 would take the average of the local trust score (10), and the received trust scores from trusted device A 205 (10), and trusted device C 215 (10), and determine that the combined trust score is 10. Because 10 is above the trust threshold, trusted device B 210 determines that it is trustworthy. Trusted device C 215 would take the average of the local trust score (10), and the received trust scores from trusted device B 210 (1), and trusted device C 215 (1), and determine that the combined trust score is 4. Because 4 is below the trust threshold of 5, trusted device C 215 determines that it is untrustworthy, and action is taken to restrict activity of trusted device C 215.

Figure 6:
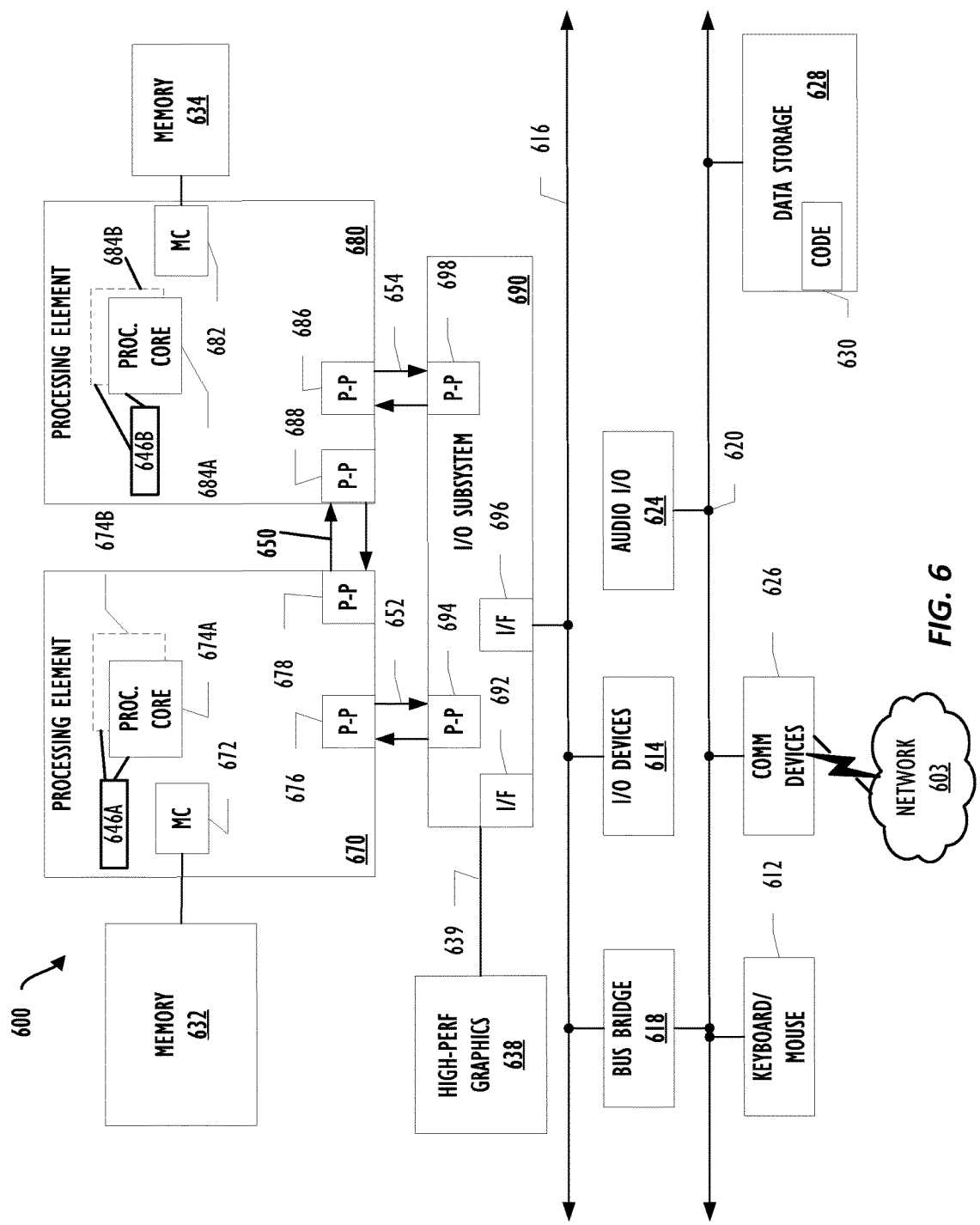
FIG. 6 is a diagram illustrating a computing device for use with techniques described herein according to one embodiment.

Referring now to FIG. 6, a block diagram illustrates a programmable device 600 that may be used within a trusted device, such as trusted device A 205, trusted device B 210, and trusted device C 215 in accordance with one or more embodiments. The programmable device 600 illustrated in FIG. 6 is a multiprocessor programmable device that includes a first processing element 670 and a second processing element 680. While two processing elements 670 and 680 are shown, an embodiment of programmable device 600 may also include only one such processing element.

Programmable device 600 is illustrated as a point-to-point interconnect system, in which the first processing element 670 and second processing element 680 are coupled via a point-to-point interconnect 650. Any or all of the interconnects illustrated in FIG. 6 may be implemented as a multi-drop bus rather than point-to-point interconnects.

As illustrated in FIG. 6, each of processing elements 670 and 680 may be multicore processors, including first and second processor cores (i.e., processor cores 674a and 674b and processor cores 684a and 684b). Such cores 674a, 674b, 684a, 684b may be configured to execute instruction code in a manner similar to that discussed above in connection with FIGS. 1-5. However, other embodiments may use processing elements that are single core processors as desired. In embodiments with multiple processing elements 670, 680, each processing element may be implemented with different numbers of cores as desired.

Each processing element 670, 680 may include at least one shared cache 646. The shared cache 646a, 646b may store data (e.g., instructions) that are utilized by one or more components of the processing element, such as the cores 674a, 674b and 684a, 684b, respectively. For example, the shared cache may locally cache data stored in a memory 632, 634 for faster access by components of the processing elements 670, 680. In one or more embodiments, the shared cache 646a, 646b may include one or more mid-level caches, such as level 2 (L2), level 3 (L3), level 4 (L4), or other levels of cache, a last level cache (LLC), or combinations thereof.

While FIG. 6 illustrates a programmable device with two processing elements 670, 680 for clarity of the drawing, the scope of the present invention is not so limited and any number of processing elements may be present. Alternatively, one or more of processing elements 670, 680 may be an element other than a processor, such as an graphics processing unit (GPU), a digital signal processing (DSP) unit, a field programmable gate array, or any other programmable processing element. Processing element 680 may be heterogeneous or asymmetric to processing element 670. There may be a variety of differences between processing elements 670, 680 in terms of a spectrum of metrics of merit including architectural, microarchitectural, thermal, power consumption characteristics, and the like. These differences may effectively manifest themselves as asymmetry and heterogeneity amongst processing elements 670, 680. In some embodiments, the various processing elements 670, 680 may reside in the same die package.

First processing element 670 may further include memory controller logic (MC) 672 and point-to-point (P-P) interconnects 676 and 678. Similarly, second processing element 680 may include a MC 682 and P-P interconnects 686 and 688. As illustrated in FIG. 6, MCs 672 and 682 couple processing elements 670, 680 to respective memories, namely a memory 632 and a memory 634, which may be portions of main memory locally attached to the respective processors. While MC logic 672 and 682 is illustrated as integrated into processing elements 670, 680, in some embodiments the memory controller logic may be discrete logic outside processing elements 670, 680 rather than integrated therein.

Processing element 670 and processing element 680 may be coupled to an I/O subsystem 690 via respective P-P interconnects 676 and 686 through links 652 and 654. As illustrated in FIG. 6, I/O subsystem 690 includes P-P interconnects 694 and 698. Furthermore, I/O subsystem 690 includes an interface 692 to couple I/O subsystem 690 with a high performance graphics engine 638. In one embodiment, a bus (not shown) may be used to couple graphics engine 638 to I/O subsystem 690. Alternately, a point-to-point interconnect 639 may couple these components.

In turn, I/O subsystem 690 may be coupled to a first link 616 via an interface 696. In one embodiment, first link 616 may be a Peripheral Component Interconnect (PCI) bus, or a bus such as a PCI Express bus or another I/O interconnect bus, although the scope of the present invention is not so limited.

As illustrated in FIG. 6, various I/O devices 614, 624 may be coupled to first link 616, along with a bridge 618 which may couple first link 616 to a second link 620. In one embodiment, second link 620 may be a low pin count (LPC) bus. Various devices may be coupled to second link 620 including, for example, a keyboard/mouse 612, communication device(s) 626 (which may in turn be in communication with the computer network 603), and a data storage unit 628 such as a disk drive or other mass storage device which may include code 630, in one embodiment. The code 630 may include instructions for performing embodiments of one or more of the techniques described above. Further, an audio I/O 624 may be coupled to second bus 620.

Note that other embodiments are contemplated. For example, instead of the point-to-point architecture of FIG. 6, a system may implement a multi-drop bus or another such communication topology. Although links 616 and 620 are illustrated as busses in FIG. 6, any desired type of link may be used. Also, the elements of FIG. 6 may alternatively be partitioned using more or fewer integrated chips than illustrated in FIG. 6.

Figure 7:
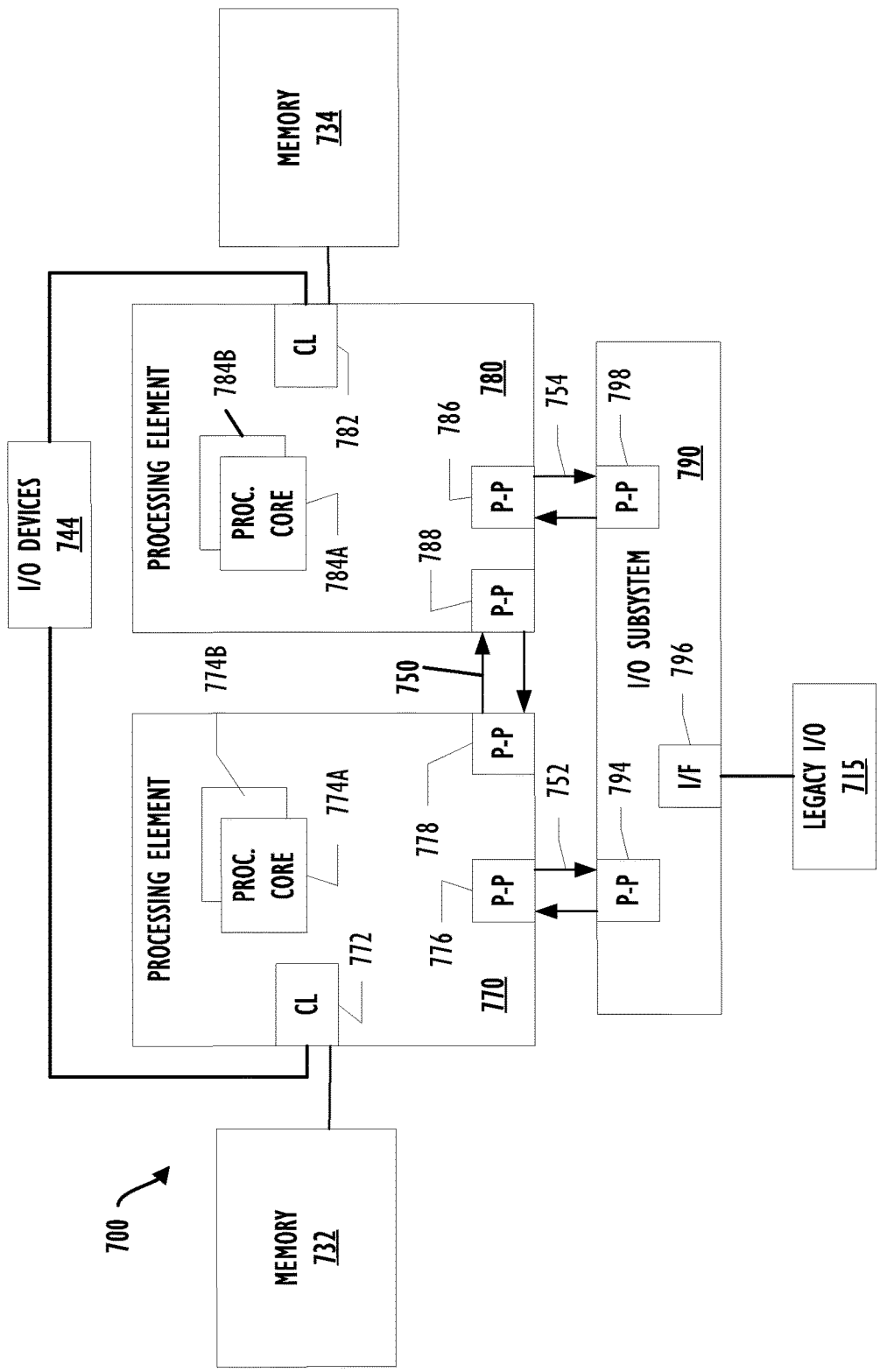
FIG. 7 is a block diagram illustrating a computing device for use with techniques described herein according to another embodiment.

Referring now to FIG. 7, a block diagram illustrates a programmable device 700 according to another embodiment. Certain aspects of FIG. 6 have been omitted from FIG. 7 in order to avoid obscuring other aspects of FIG. 7.

FIG. 7 illustrates that processing elements 770, 780 may include integrated memory and I/O control logic ("CL") 772 and 782, respectively. In some embodiments, the 772, 782 may include memory control logic (MC) such as that described above in connection with FIG. 6. In addition, CL 772, 782 may also include I/O control logic. FIG. 7 illustrates that not only may the memories 732, 734 be coupled to the 772, 782, but also that I/O devices 744 may also be coupled to the control logic 772, 782. Legacy I/O devices 715 may be coupled to the I/O subsystem 790 by interface 796. Each processing element 770, 780 may include multiple processor cores, illustrated in FIG. 7 as processor cores 774A, 774B, 784A, and 784B. As illustrated in FIG. 7, I/O subsystem 790 includes P-P interconnects 794 and 798 that connect to P-P interconnects 776 and 786 of the processing elements 770 and 780 with links 752 and 754. Processing elements 770 and 780 may also be interconnected by link 750 and interconnects 778 and 788, respectively.

The programmable devices depicted in FIGS. 6 and 7 are schematic illustrations of embodiments of programmable devices which may be utilized to implement various embodiments discussed herein. Various components of the programmable devices depicted in FIGS. 6 and 7 may be combined in a system-on-a-chip (SoC) architecture.

It is to be understood that the various components of the flowchart described above, could occur in a different order or even concurrently. It should also be understood that various embodiments of the inventions may include all or just some of the components described above. Thus, the flowcharts are provided for better understanding of the embodiments, but the specific ordering of the components of the flow chart are not intended to be limiting unless otherwise described so.

Program instructions may be used to cause a general-purpose or special-purpose processing system that is programmed with the instructions to perform the operations described herein. Alternatively, the operations may be performed by specific hardware components that contain hardwired logic for performing the operations, or by any combination of programmed computer components and custom hardware components. The methods described herein may be provided as a computer program product that may include a machine readable medium having stored thereon instructions that may be used to program a processing system or other electronic device to perform the methods. The term "machine readable medium" used herein shall include any medium that is capable of storing or encoding a sequence of instructions for execution by the machine and that cause the machine to perform any one of the methods described herein. The term "machine readable medium" shall accordingly include, but not be limited to, tangible, non-transitory memories such as solid-state memories, optical and magnetic disks. Furthermore, it is common in the art to speak of software, in one form or another (e.g., program, procedure, process, application, module, logic, and so on) as taking an action or causing a result. Such expressions are merely a shorthand way of stating that the execution of the software by a processing system causes the processor to perform an action or produce a result.

The following examples pertain to further embodiments.

Example 1 is a machine readable medium on which instructions are stored, comprising instructions that when executed by a processor cause a machine to: collect, by a local trusted network device, local trust data related to behavior of the local trusted network device; receive, from one or more remote trusted network devices, additional trust data for the local trusted network device; calculate a combined trust score for the local trusted network device based on the local trust data and additional trust data; and modifying activity of the local trusted network device based on the combined trust score.

In Example 2, the subject matter of Example 1 can optionally include the additional trust data comprising a trust score determined by one of the one or more remote trusted network devices.

In Example 3, the instructions that cause the machine to restrict activity of the local trusted network device of Example 1 can optionally include instructions that cause the machine to restrict network access by the local trusted network device.

In Example 4, the instructions that cause the machine to calculate a combined trust score for the local trusted network device of Example 1 can optionally include instructions that cause the machine to determine a total number of the one or more trusted network devices from which additional trust data is received, verify that the total number of the one or more trusted network devices satisfies a quorum, and in response to verifying that the total number of the one or more trusted network devices satisfies the quorum, calculate the combined trust score.

In Example 5, the subject matter of Example 1 can optionally include the behavior of the local network device comprises network traffic from the device.

In Example 6, the subject matter of Example 1 can optionally include the behavior of the local network device comprises an indication of physical tampering of the local trusted network device.

In Example 7, the subject matter of Example 1 can optionally include the behavior of the local network device comprises a work load of the local trusted network device.

Example 8 includes a system for providing peer-to-peer network security, including one or more processors; and a memory, coupled to the one or more processors, on which instructions are stored which, when executed by the one or more processors cause the one or more processors to collect, by a local trusted network device, local trust data related to behavior of the local trusted network device; receive, from one or more remote trusted network devices, additional trust data for the local trusted network device; calculate a combined trust score for the local trusted network device based on the local trust data and additional trust data; and quarantine the local trusted network device based on the combined trust score.

In Example 9, the subject matter of Example 8 can optionally include the additional trust data comprising a trust score determined by each of the one or more remote trusted network devices.

In Example 10, the subject matter of Example 9 optionally including instructions to calculate a local trust score using the local trust data, wherein the instructions to calculate a combined trust score for the local trusted network device comprises averaging the trust scores determined by each of the one or more remote trusted network devices and the local trust score.

In Example 11, the instructions that cause the one or more processors to restrict activity of the local trusted network device of Example 8 can optionally include instructions that cause the one or more processors to restrict network access by the local trusted network device.

In Example 12 the instructions that cause the one or more processors to calculate a combined trust score for the local trusted network device of Example 8 can optionally include instructions that cause the one or more processors to determine a total number of the one or more trusted network devices from which additional trust data is received, verify that the total number of the one or more trusted network devices satisfies a quorum, and in response to verifying that the total number of the one or more trusted network devices satisfies the quorum, calculate the combined trust score.

In Example 13, the subject matter of Example 8 can optionally include the behavior of the local network device comprises a temperature change of the local trusted network device.

In Example 14, the subject matter of Example 8 can optionally include the behavior of the local network device comprises a work load of the local trusted network device.

Example 15 includes a method for providing peer-to-peer network security, comprising collecting, by a local trusted network device, local trust data related to behavior of the local trusted network device; receiving, by one or more remote trusted network devices, additional trust data for the local trusted network device; calculating a combined trust score for the local trusted network device based on the local trust data and additional trust data; determining that the combined trust score does not satisfy a predefined trust threshold score; and restricting, in response to determining that the combined trust score does not satisfy a predefined trust threshold score, activity of the local trusted network device based on the combined trust score.

In Example 16, the subject matter of Example 15 can optionally include the additional trust data comprises a trust score determined by one of the one or more remote trusted network devices.

In Example 17, the subject matter of Example 15 can optionally include restricting network access by the local trusted network device.

In Example 18, the subject matter of Example 15 can optionally include calculating a combined trust score for the local trusted network device comprises determining a total number of the one or more trusted network devices from which additional trust data is received, verifying that the total number of the one or more trusted network devices satisfies a quorum, and in response to verifying that the total number of the one or more trusted network devices satisfies the quorum, calculating the combined trust score.

In Example 19, the subject matter of Example 15 can optionally include the behavior of the local network device comprises network traffic from the device.

In Example 20, the subject matter of Example 15 can optionally include the behavior of the local network device comprises a temperature change of the local trusted network device.

In Example 21, the subject matter of Example 15 can optionally include the behavior of the local network device comprises a work load of the local trusted network device.

Example 22 includes a machine readable medium on which instructions are stored, comprising instructions that when executed cause a machine to collect, by a local trusted network device, first trust data related to behavior of a target remote trusted network device; receive, from one or more remote trusted network devices, additional trust data for the target remote trusted network device; calculate a combined trust score for the target remote trusted network device based on the first trust data and the additional trust data; and transmit a message to restrict activity of the target remote trusted network device to the target remote trusted network device based on the combined trust score.

In Example 23, the subject matter of Example 22 can optionally include the additional trust data comprising a trust score determined by one of the one or more remote trusted network devices.

In Example 24, the subject matter of Example 22 can optionally include that the message directs the target remote trusted network device to restrict network access by the target trusted network device.

In Example 25, the subject matter of Example 22 can optionally include instructions that cause the machine to determine a total number of the one or more trusted network devices from which additional trust data is received, verify that the total number of the one or more trusted network devices satisfies a quorum, and in response to verifying that the total number of the one or more trusted network devices satisfies the quorum, calculate the combined trust score.

Example 26 includes a network device, comprising: means for collecting, by a local trusted network device, local trust data related to behavior of the local trusted network device; receiving, from one or more remote trusted network devices, additional trust data for the local trusted network device; means for calculating a combined trust score for the local trusted network device based on the local trust data and additional trust data; means for determining that the combined trust score does not satisfy a predefined trust threshold score; and means for modifying, in response to determining that the combined trust score does not satisfy a predefined trust threshold score, activity of the local trusted network device based on the combined trust score.

Example 27 includes a network device, comprising: means for collecting, by a local trusted network device, first trust data related to behavior of a target remote trusted network device; means for receiving, from one or more remote trusted network devices, additional trust data for the target remote trusted network device; means for calculating a combined trust score for the target remote trusted network device based on the first trust data and the additional trust data; and means for transmitting a message to modify activity of the target remote trusted network device to the target remote trusted network device based on the combined trust score.

Example 28 includes a method for providing peer-to-peer network security, comprising: collecting, by a local trusted network device, first trust data related to behavior of a target remote trusted network device; receiving, from one or more remote trusted network devices, additional trust data for the target remote trusted network device; calculating a combined trust score for the target remote trusted network device based on the first trust data and the additional trust data; and transmitting a message to modify activity of the target remote trusted network device to the target remote trusted network device based on the combined trust score.

Example 29 includes a machine-readable storage including machine-readable instructions, when executed, to perform the method of any of Examples 15-21.

Example 30 includes a machine-readable storage including machine-readable instructions, when executed, to perform the method of Example 28.

It is to be understood that the above description is intended to be illustrative, and not restrictive. For example, the above-described embodiments may be used in combination with each other. As another example, the above-described flow diagrams include a series of actions which may not be performed in the particular order depicted in the drawings. Rather, the various actions may occur in a different order, or even simultaneously. Many other embodiment will be apparent to those of skill in the art upon reviewing the above description. The scope of the invention should therefore should be determined with reference to the appended claims, along with the full scope of equivalents to which such claims are entitled.

What is claimed is:

1. A non-transitory machine readable medium comprising instructions that, when executed, cause a machine to:
   collect, by a local trusted network device, local trust data related to behavior of the local trusted network device;
   receive, from one or more remote trusted network devices, additional trust data for the local trusted network device;
   determine a total number of the one or more remote trusted network devices from which the additional trust data is received,
   verify that the total number of the one or more remote trusted network devices satisfies a quorum, and
   in response to verifying that the total number of the one or more remote trusted network devices satisfies the quorum:
      calculate a combined trust score for the local trusted network device based on the local trust data and the additional trust data; and
      modify activity of the local trusted network device based on the combined trust score.

2. The non-transitory machine readable medium of claim 1, wherein the additional trust data comprises a trust score determined by each of the one or more remote trusted network devices.

3. The non-transitory machine readable medium of claim 1, wherein the instructions that cause the machine to modify activity of the local trusted network device comprise instructions that cause the machine to restrict network access by the local trusted network device.

4. The non-transitory machine readable medium of claim 1, wherein the behavior of the local trusted network device comprises network traffic from the local trusted network device.

5. The non-transitory machine readable medium of claim 1, wherein the behavior of the local trusted network device comprises an indication of physical tampering of the local trusted network device.

6. The non-transitory machine readable medium of claim 1, wherein the behavior of the local trusted network device comprises a work load of the local trusted network device.

7. A system for providing peer-to-peer network security, comprising:
   one or more processors; and
   a memory, coupled to the one or more processors, comprising instructions which, when executed by the one or more processors, cause the one or more processors to:
      collect, by a local trusted network device, local trust data related to behavior of the local trusted network device, the behavior comprising network traffic related to the local trusted network device;
      receive, from one or more remote trusted network devices, additional trust data for the local trusted network device;
      determine a total number of the one or more remote trusted network devices from which the additional trust data is received,
      verify that the total number of the one or more remote trusted network devices satisfies a quorum, and
      in response to verifying that the total number of the one or more remote trusted network devices satisfies the quorum:
         calculate a combined trust score for the local trusted network device based on the local trust data and the additional trust data; and
         quarantine the local trusted network device based on the combined trust score.

8. The system of claim 7, wherein the additional trust data comprises a trust score determined by each of the one or more remote trusted network devices.

9. The system of claim 8, the instructions further causing the one or more processors to:
   calculate a local trust score using the local trust data,
   wherein the instructions to calculate a combined trust score for the local trusted network device comprises averaging the trust scores determined by each of the one or more remote trusted network devices and the local trust score.

10. The system of claim 7, wherein the instructions to quarantine the local trusted network device further comprise instructions that when executed cause the one or more processors to restrict network access by the local trusted network device.

11. The system of claim 7, wherein the behavior of the local trusted network device comprises an indication of physical tampering of the local trusted network device.

12. The system of claim 7, wherein the behavior of the local trusted network device comprises a work load of the local trusted network device.

13. A method for providing peer-to-peer network security, comprising:
   collecting, by a local trusted network device, local trust data related to behavior of the local trusted network device;
   receiving, from one or more remote trusted network devices, additional trust data for the local trusted network device;
   determining a total number of the one or more remote trusted network devices from which the additional trust data is received,
   verifying that the total number of the one or more remote trusted network devices satisfies a quorum, and
   in response to verifying that the total number of the one or more remote trusted network devices satisfies the quorum:
      calculating a combined trust score for the local trusted network device based on the local trust data and the additional trust data;
      determining that the combined trust score does not satisfy a predefined trust threshold score; and
   modifying, in response to determining that the combined trust score does not satisfy the predefined trust threshold score, activity of the local trusted network device based on the combined trust score.

14. The method of claim 13, wherein the additional trust data comprises a trust score determined by one of the one or more remote trusted network devices.

15. The method of claim 13, wherein the modifying of the activity of the local trusted network device comprises correcting the activity by the local trusted network device.

16. The method of claim 13, wherein the behavior of the local trusted network device comprises network traffic from the local trusted network device.

17. The method of claim 13, wherein the behavior of the local trusted network device comprises a temperature change of the local trusted network device.

18. The method of claim 13, wherein the behavior of the local trusted network device comprises a work load of the local trusted network device.

19. A non-transitory machine readable medium comprising instructions that, when executed, cause a machine to:
collect, by a local trusted network device, first trust data related to behavior of a target remote trusted network device;
receive, from one or more remote trusted network devices, additional trust data for the target remote trusted network device;
determine a total number of the one or more remote trusted network devices from which the additional trust data is received,
verify that the total number of the one or more remote trusted network devices satisfies a quorum, and
in response to verifying that the total number of the one or more remote trusted network devices satisfies the quorum:
calculate a combined trust score for the target remote trusted network device based on the first trust data and the additional trust data; and
transmit a message to modify activity of the target remote trusted network device to the target remote trusted network device based on the combined trust score.

20. The non-transitory machine readable medium of claim 19, wherein the additional trust data comprises a trust score determined by one of the one or more remote trusted network devices.

21. The non-transitory machine readable medium of claim 19, wherein the message directs the target remote trusted network device to restrict network access by the target remote trusted network device.

\* \* \* \* \*